United States Patent

[11] 3,579,895

[72] Inventors Vernon B. Orn
 12733 S.E. 163rd, Renton, Wash. 98055;
 Richard E. Cook, 9821 N.E. 16th, Bellevue, Wash. 98004
[21] Appl. No. 769,238
[22] Filed Oct. 21, 1968
[45] Patented May 25, 1971

[54] ARTIFICIAL FISH LURE AND METHOD OF MAKING SAME
 19 Claims, 3 Drawing Figs.
[52] U.S. Cl. .................................................. 43/17.6,
 43/42.06, 43/42.34, 43/42.53, 156/307, 264/14, 264/331
[51] Int. Cl. ........................................................ A01k 85/00
[50] Field of Search ............................................ 43/42.06, 42.53, 44.99, 42.38, 42,34, 17.6

[56] References Cited
 UNITED STATES PATENTS

| | | | |
|---|---|---|---|
| 825,232 | 7/1906 | Mitchell | 43/42.38 |
| 2,753,651 | 7/1956 | Fisher | 43/42.53 |
| 2,827,376 | 3/1958 | Breuer | (43/44.99UX) |
| 2,860,440 | 11/1958 | Hendry | 43/42.34X |
| 2,979,778 | 4/1961 | FitzSimons | 43/42.06X |
| 3,390,478 | 7/1968 | McKnight et al. | 43/17.6 |
| 3,421,899 | 1/1969 | Humphreys | 43/44.99X |

FOREIGN PATENTS

| 21,499 | 1903 | Great Britain | 43/42.06 |
|---|---|---|---|

*Primary Examiner*—Samuel Koren
*Assistant Examiner*—Daniel J. Leach
*Attorney*—Graybeal, Cole & Barnard

ABSTRACT: Artificial fish lures, such as simulated bait fish eggs, characterized by a substantially homogeneous body form, either as single spheres or as fused clusters. A typical formulation involves highly plasticized polyvinyl chloride resin with a cured Shore-A-Durometer hardness of 3—10, and with fish-attracting odorant and plasticizer, such as salmon oil, dispersed throughout each spherical egg and continually forming a milky emulsion at the surface when the egg is exposed to water. A typical method of forming the simulated eggs comprises introducing unfused plastisol into a hot liquid bath of a regulated specific gravity so that each plastisol droplet enters the bath and drops toward the bottom of the bath until its temperature increases sufficiently to lower its specific gravity whereupon each droplet rises to the surface of the bath as a substantially spherical body. The spherical bodies are then removed and cooled, either singly or as clusters.

PATENTED MAY 25 1971
3,579,895
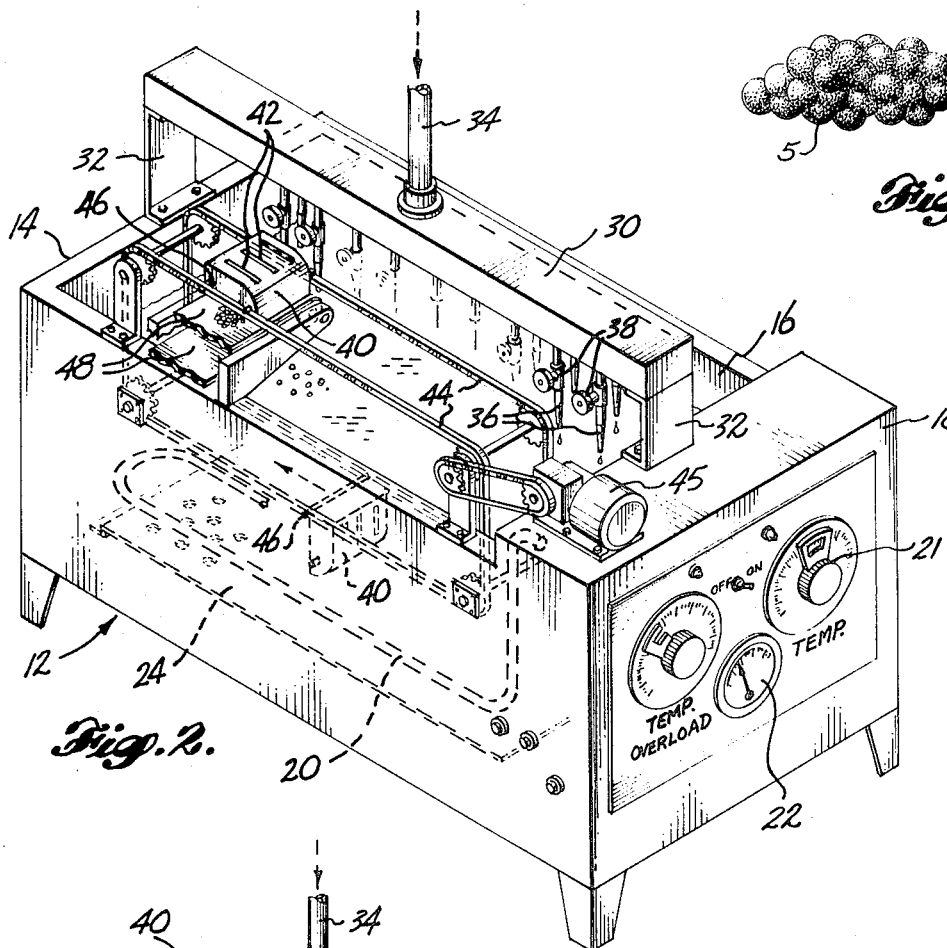
Fig. 1.
Fig. 2.
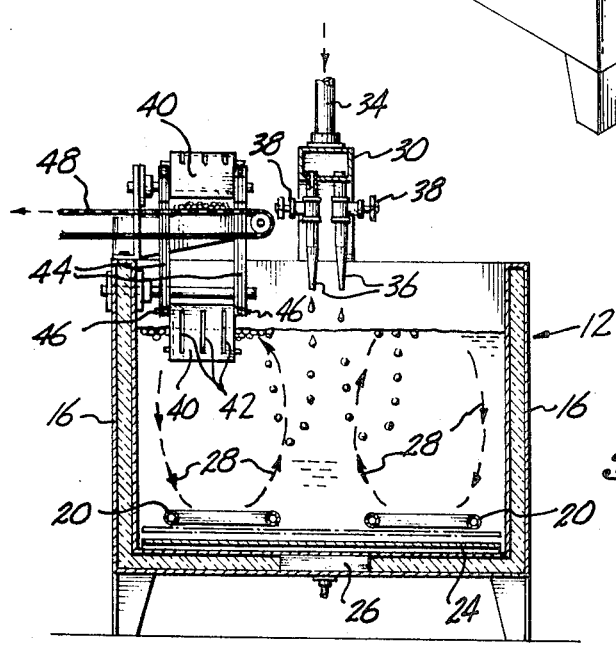
Fig. 3.
INVENTORS
VERNON B. ORN
RICHARD E. COOK
BY
Graybeal, Cole & Barnard
ATTORNEYS

ARTIFICIAL FISH LURE AND METHOD OF MAKING SAME

BACKGROUND OF THE INVENTION

1. Field of the Invention

This invention relates to artificial fish lures, such as synthetic bait egg-type artificial fish lures, either in the form of single eggs or as egg clusters or parts of "skeins," and to a method of making same.

2. Description of the Prior Art

It is well known that certain fish, such as steelhead and cutthroat trout, are attracted to a bait resembling a fish egg, or a fish egg cluster taken from a natural "skein" of eggs. Conventional practice is to recover natural eggs from certain fish such as salmon and use them as bait before spoilage sets in. Various techniques, such as freezing or curing, have been employed to process natural eggs to retard spoilage. One typical curing technique is described in Tereski U.S. Pat. No. 2,743,185. Some of the problems necessarily incident to the use of natural eggs are that the source, that is, the fish, are not always available, the eggs must be treated and stored in a manner which will not damage them, and the eggs must be used prior to spoilage. In addition, the natural eggs separate from the skein members and are easily washed off of the hook when fished.

Lures intended to simulate eggs or clusters of eggs have also been employed heretofore. The usual practice in making these egg-simulating lures is to encapsulate a fish-attracting liquid into a spherical form or to form the eggs by injection molding. Fish-attracting colors, such as fluorescent dyes, are added to the molded plastic, in some cases, and in other cases the egg-simulating lures are formed then packed in a more or less viscous liquid comprising a fish-attracting odorant. These various techniques are in general quite costly and the resultant lures have been generally unsatisfactory when used as a bait. One reason for this lack of success is believe to be that the fish-attracting material leaches out and/or is washed from the simulated eggs shortly after being immersed. Another reason is that the size, firmness and appearance of these synthetic eggs do not sufficiently simulate natural fish eggs. For example, the encapsulated liquid form of egg will collapse after the hook has penetrated the tough outer covering, and the eggs formed by injection molding are generally so firm and so large that they unduly impede penetration of the barb of the hook into the membrane of the fish's mouth when the fish bites the hook.

SUMMARY OF THE INVENTION

This invention relates to artificial fish lures, such as bait egg-simulating fish lures that closely resemble natural fish eggs or cluster of eggs and in certain features relates to other forms of fish lures simulating the flavor or odor of a natural bait. Characteristically, the simulated eggs are formed of highly plasticized resins with fish-attracting materials, such as odorants, colorants and/or flavorants, uniformly dispersed throughout the body of each egg. In preferred forms, the fish-attracting odorant or flavorant is in a form to also plasticize the resin and to yield a "milky" emulsion when exposed to water at the surface of the egg, the supply of odorant being thus continually available at the surface by migrant replenishment.

In addition, the invention relates to a unique method of making artificial lures to closely simulate bait fish eggs or the like. The method employs the unique relationship between specific gravities of the constituents of the eggs and the plastisol fusion bath. In practice of this technique, a plastisol dispersion is dropped into the bath in droplets and when fused by the heat of the bath the dispersion droplets are of essentially spherical form and rise to the surface of the bath for ease of collection. The resulting plasticized resin spheres are then collected together in clusters which upon cooling become bonded or fused to one another in a manner closely resembling part of a fish skein. Alternatively, the spheres can be removed and collected separately to provide single simulated eggs.

BRIEF DESCRIPTION OF THE DRAWING

FIG. 1 illustrates a cluster of artificial fish eggs simulating a fish skein and made according to the present invention.

FIG. 2 is an is an isometric, somewhat schematic illustration of an apparatus particularly suited for practice of the method of the invention.

FIG. 3 is a transverse vertical section of the machine shown in FIG. 1, showing the paths of travel of typical dispersion droplets during fusion thereof.

DESCRIPTION OF THE PREFERRED EMBODIMENT

In general, the method of making simulated bait fish eggs and like artificial lures according to the invention comprises introducing droplets of a resin dispersion of highly plasticized resin into a hot liquid bath, suitably a blend of a polyol and glycerin, maintained at dispersion fusion temperature, the droplet being introduced with sufficient momentum to break the surface of the bath and sink toward the bottom of the bath. It is highly desirable that the specific gravities of the hot bath and the resin dispersion be critically maintained so that the unheated, unfused resin droplets sink and remain beneath the surface of the bath for a time sufficient to cause fusion, then return to the bath surface upon fusion. Since the specific gravity of the dispersion droplets decreases with heating, if the specific gravity of the bath is properly maintained, the droplets upon becoming heated are lighter than the liquid bath, thus causing the droplets to rise to the surface for ease of collection.

The resin dispersion and plasticizer mixture is of a type commonly known as a plastisol. In general, the plastisol employed comprises relatively high molecular weight polyvinyl chloride resin dispersed in a blend of plasticizers. The ratio of plasticizer to resin is high, namely, from about 3 to 1 to about 6 to 1, resulting in a firm but pliant fused body having a Shore-A-Durometer hardness in the range of about 3—10, with the range of 5—6 being preferred. A body of this hardness rating maintains its shape to closely resemble a natural egg and yet is soft enough to yield so as to not impede penetration of the hook's barb into the membrane of the fish's mouth when the bait is in use. A typical formulation of a plastisol which may be employed as a starting material for producing simulated fish eggs according to the invention is as follows:

|  | Parts by weight |
|---|---|
| Polyvinyl chloride dispersion resin | 40 |
| Salmon oil | 25 |
| S-213 | 6 |
| Mark BB | .8 |
| Mark C | .27 |
| Drapex 4.4 | 4 |
| S-480 | 95 |
| S-213 | 30 |
| Santocel Z | 3 |
| Yellow dye | 3 |
| Total | 207.07 |

S-480, S-213 and Santocel Z are premixed and then are mixed into a slurry of the first six constituents listed. The dye is added to the final mixture to obtain the desired tint, then the mixture is deaired or degassed by conventional techniques. The air is removed so that the specific gravity is relatively uniform throughout each batch of plastisol.

This first formulation is preferred as it produces an egg that is softer than the eggs produced in the subsequent formations.

A second typical formulation is:

|  | Parts by weight |
|---|---|
| Polyvinyl chloride resin | 44.2 |
| Salmon oil | 26.6 |
| S-213 | 6.6 |
| Mark BB | .9 |
| Mark C | .3 |
| Drapex 4.4 | 4.4 |
| S-480 | 97.4 |
| S-213 | 20.0 |
| Santocel Z | 2.0 |
| Red dye | 2.0 |

The constituents are mixed and deaired in the manner described for the first formulation.

A third formulation, which is a basic formulation without an oily fish-attracting odorant, is:

|  | Weight percent |
|---|---|
| Polyvinyl chloride resin | 22.12 |
| HB-40 | 13.28 |
| Drapex 4.4 | 2.21 |
| Mark BB | 0.45 |
| S-480 | 61.94 |
| Fluorescent dye | 2.00 |

In all of the above formulations the polyvinyl chloride is of a type known as Diamond PVC-7502, manufactured by the Diamond Alkali Company. Salmon oil is natural salmon fish oil extracted from a rendering process. S-213 is a plasticizer imparting a high degree of "slip" to the finished formulation and is manufactured by the Monsanto Chemical Company under the trade name Santicizer 213. S-480 is a plasticizer providing permanence and is manufactured by the Monsanto Chemical Company under the trademark Santicizer 480. Mark BB is a liquid barium-cadmium-zinc multipurpose stabilizer and provides bubble-break properties, being manufactured under the Mark BB trademark by Argus Chemical Corporation. Mark C is a trademark for a phosphite chelator also manufactured by the Argus Chemical Corporation. Santocel Z is a fine particle silica added to increase viscosity. Drapex 4.4 is a conventional heat stabilizer.

The constituency of the plastisol may be varied by the use of alternative or additional plasticizers and the like. Preferably the constituents of a formulation must satisfy several criteria, namely, (1) upon curing the hardness will be within the desired Shore A Durometer range, (2) will be immiscible with the liquid in the bath so that an egg is produced which retains its color and gloss and will not disintegrate in the bath, (3) add sufficient permanence so that the constituents will not chemically attack the container used to store the eggs, and (4) have a specific gravity so that at a temperature below fusion temperature the plastisol will sink in the bath and at fusion temperature will rise to the surface. Larger eggs may also be manufactured merely by increasing the viscosity of the plastisol and thus increasing the size of the droplets.

The salmon oil increases the slippery feel and smell or taste of the eggs to closely simulate a natural egg in these respects. Other fish-attracting materials, such as anise oil, or herring or other fish oils may be used. The use of salmon oil or the like in the formulation has been discovered to impart to the lure two unique features. The first is that by uniformly dispersing the oil throughout the body in a manner enabling osmotic or like migration of the oil to the surface of the body, the oil is continuously released into the water in the form of a milky emulsion closely simulating the "milkiness" of a natural egg. The second feature is that the salmon oil as used in the plastisol formulation has good plasticizing characteristics and thus helps to soften the lure. Herring oil, for example, is even more effective as a plasticizer than salmon oil. Even more uniquely, the salmon oil "spews," that is, becomes released from its intermolecular, plasticizing relationship with the resin and emerges to the surface of the lure over a long period to be released to the water as a fish-attracting emulsion. It is notable that an oil that readily spews is generally undesirable as a resin plasticizer for general use. The two-fold advantage derived from salmon oil or the like, used as a plasticizer and as a fish attractant, thus provides unique characteristics to lures formulated and fabricated according to the present invention. It is also be to recognized, of course, that these two unique features are not necessarily limited to fish egg-simulating lures but are equally applicable to lures of other shapes and made by different processes.

The liquid bath may also have varying constituents. One requirement for a satisfactory bath is that at fusing temperature the aforementioned relationship of the specific gravities of the bath and plastisol be present so that the eggs will rise in the bath. As the purpose of causing the plastisol to sink in the bath and then rise to the surface is to assure that the plastisol remains under the surface of the bath for a time sufficient to allow complete fusion, it is apparent that other techniques for accomplishing this purpose will also be satisfactory. The natural, uninterrupted travel of the plastisol within the bath, however, provides the most satisfactory egg clusters at the bath surface. Other criteria are that the liquid of the bath have a sufficiently high distillation range so that the liquid is not lost by excessive vaporization at the operating temperature of the bath and that the flash point of the bath is also well above the operating temperature.

In this regard it should be noted that the temperature range of the bath for the above plastisol formulations is 300°—330° F. and preferably is 310°—320° F. Temperatures over 330° F. cause the eggs to be too fluid and fuse into globs rather than retain their spherical characteristics. Temperatures below 300° F. are insufficient to fuse the eggs. Although not fully understood, another characteristic seems to be that the molecular weight of the bath should be under about 106, otherwise the bonds between the individual eggs are not strong enough to produce clusters suitable for remaining together on the hook while fishing. For example, a bath of diethylene glycol, molecular weight 106.1, formed excellent individual eggs but with low cluster adherence, whereas a blend of three parts by volume of 1—3 butylene glycol, molecular weight 90.12, and one part glycerin (synthetic 99.5 percent U.S.P.), molecular weight 92.1, formed excellent egg clusters. The former bath thus may be advantageously used for producing single eggs of any size or may be used to manufacture weakly bonded clusters, which although not useful for fishing as a cluster, may make a package of readily available single eggs which may be removed by the fisherman from the cluster by breaking the weak bonds.

In general, the preferred bath is a blend of glycerin (e.g. synthetic 99.5 percent U.S.P.) and either 1—3 butylene glycol, molecular weight 90.12, or propylene glycol molecular weight 76.1. The blend constituents are varied to produce a specific gravity of about 1.146 (at room temperature, 72° F.) by using varying amounts of the glycerin to increase specific gravity and one of the aforementioned polyols to reduce the specific gravity. Actual measurement of the specific gravity is not necessary. By starting with one part glycerin to two parts polyol, heating this to 310° F. and observing if a drop of egg formula plastisol floats or sinks when dropped in the bath, the bath may be brought to a workable specific gravity by adding glycerin or one of the lighter polyols. Tripropylene glycol blended with glycerin was found to be unsatisfactory as the spherical bodies tended to flatten out at the surface of the bath. Propylene glycol in the glycerin blend is satisfactory but the operating temperature of the bath is close to its distillation range (365°—374° F.). Another polyol which would appear to be satisfactory is ethylene glycol, molecular weight 62.1. It should be understood that the use of a blend of the glycerin and one of the polyols is to obtain a bath having a desired specific gravity. Therefore, several of the aforementioned polyols may be blended to reduce or eliminate the undesirable properties of any one individually. For example, a blend of diethylene glycol, tripropylene glycol and glycerin (synthetic 99.5 percent U.S.P.) may be satisfactory even though the blend of glycerin and tripropylene is not.

The depth of the bath should be at least 4 or 5 inches to give the plastisol sufficient time in the bath to become completely fused before returning to the surface of the bath. Likewise in dropping the plastisol into the bath the drops must come from a sufficient height, about 1 inch for small eggs, to enable the droplets to break the surface of the bath and sink towards the bottom. The curing time is at least 15 seconds and the fused plastisol may remain in the bath before removal for reasonable periods beyond the 15 seconds. If the density of the bath is too high or the bath too hot the fused plastisol bodies tend to flatten. The formulas of the plasticizer, as noted above, are stabilized with heat stabilizers, such as the Drapex 4.4, to tolerate several minutes in the bath without discoloring.

The floating eggs scooped up together form clusters resembling parts of skeins. Hot eggs from the bath dropped onto cool eggs will fuse to the cool eggs sufficiently to form a tenacious cluster that won't fall off a hook and will withstand forces normally encountered while fishing them at the end of a line without coming off or disengaging themselves from the cluster. However, the unique feature of these clustered eggs is that the fisherman may still tear the clusters into smaller clusters with his fingers, the eggs separating at their junctures to retain their spherical shapes.

The method of the instant invention may be carried out in several ways, one of which is merely to dispense droplets of a plastisol of the desired formulation into a beaker of the desired liquid bath heated to fusion temperature. The spherical eggs thus formed are then spooned or scooped from the surface of the bath. The method is more advantageously performed to produce production quantities of individual fish egg-simulating lures or clusters on the equipment illustrated in FIGS. 2 and 3. Basically, this equipment includes a conventional heating tank 12 having suitable insulated end wall 14, sidewalls 16 and a control unit 18 forming an end wall opposite to the end wall 14. A typical tank of this type is manufactured by Blue M Electric Company, Blue Island, Illinois, under their Model No. MW1165C-1. Such equipment typically employs conventional heating coils 20 thermostatically controlled by a dial 21 and a visual thermometer 22. As is well known, such controls enable the bath to be maintained at a constant desired temperature. The equipment also includes an agitator in the form of a conventional pulsating plate 24 that is reciprocated by a magnetic pulsator 26 adjacent the bottom of the tank. The frequency and duration of the agitation is controlled in a known manner. As is best shown in FIG. 3, the pulsating plate creates circulatory flow patterns tending to move the liquid near the surface of the bath toward the opposed sidewalls 16 of the tank. The circulatory path may be in other directions and other agitators may by used. It has been found that a gentle agitation as provided by the pulsating plate is preferable as it moves the individual eggs to the sides of the bath enabling them to be gathered in clusters. The paths of the circulation are indicated by the arrows 28 in FIG. 3 and the paths of the individual droplets are also illustrated.

As mentioned earlier, the preferred form for introducing the plastisol into the bath is by way of droplets. The plastisol may be introduced in other forms, such as in a stream, provided however, that there is sufficient dispersing into individual spherical bodies while the plastisol is in the bath. For the purpose of introducing droplets into the bath, a manifold 30 is suspended above the tank by brackets 32 secured to the end wall 14 and the control unit 18. The liquid plastisol is introduced into the manifold through a conduit 34 and emerges in droplet form through a plurality of nozzles 36. As indicated in FIG. 2 the nozzles are staggered longitudinally of the tank and are spaced in two (or more) parallel rows. Although a central control could be used to regulate the flow of plastisol, individual valves 38 are provided for each nozzle to regulate the droplet rate of flow through the nozzles. A preferred droplet rate through each nozzle is about 160 drops per minute. The droplet rate is controlled primarily by the rate of removal of the eggs from the bath.

After the droplets have been formed in the bath into spherical bodies and are moved towards the sidewalls 16 of the tank they are removed in package-sized clusters by a plurality of scoops 40. Any suitable scoop will suffice; however, in the preferred form, the scoops are provided with transversely spaced slots 42 or rows of small openings which allow the liquid to drain out of the scoops. It has been found that the maximum number of drainage openings should be provided and the openings should be as small as possible so that small eggs do not become wedged within the openings. Also, the surface of the scoop may be coated with a low friction material such as Teflon. The scoops are moved through the bath by a conventional chain and sprocket drive 44 powered by a motor 45. The scoops are secured to the chains at spaced intervals by pivot pins 46 in a conventional manner. The spacing is determined by the speed of the chains and by regulation of the flow rate of the plastisol. The pins are provided at the open side of the scoops such that the scoops dip down into the bath while within the tank. As the scoops round the sprockets at the lower end of the tank, having entrapped a cluster of the spherical eggs, the closed end walls of the scoops rest against the chains so that the scoops are raised from the tank in an upright position. After passing the uppermost sprockets at the end of the tank the scoops are tipped to deposit their contents in a cluster on a takeaway conveyor 48. Any suitable belt may be employed as the takeaway conveyor. As an alternative, the clusters of eggs may be deposited on a chute and slid from the tank. Although the scoops are shown on one side of the tank only it should be understood that similar scoops and conveyor mechanisms, not shown, are provided to remove the eggs from the opposite side of the tank also. After leaving the tank the clusters are deposited into a tank of cooling liquid, such as water, where they are cooled below the fusion temperature forming the tenacious bonds between the individual spherical bodies to form the clusters. In the preferred form the clusters will be in package size form and ready for packaging and shipment.

As mentioned earlier, individual eggs of any size may also be made in the production equipment merely by changing the constituency of the liquid bath, such as by using a blend of diethylene glycol with small amounts of glycerin added to obtain the desired specific gravity. Likewise, individual eggs may be obtained by changing the flow rate of plastisol emerging from the nozzles 36 or changing the plastisol formulation. In addition, the size of the eggs may be varied by changing the size of the openings in the nozzles.

The eggs formed according to this invention may also be advantageously secured to a flasher, spoon or the like by their inherent adhering qualities. A typical example of a technique for securing the eggs to a spoon is to coat one side of a conventional spoon with a primer solution of the following formulation:

|  | Parts by weight |
|---|---|
| Vinyl chloride copolymer resin | .8 |
| Acrylic resin | 6.5 |
| Methylethyl ketone | 17.0 |
| Cellosolve acetate (ethylene glycol monoethyl ether acetate) | 3.0 |
| Cyclohexanone | .8 |
| Phenolic resin, e.g. Bakelite BKR2620 | 1.0 |
| Drapex 6.8 epoxy soybean heat stabilizer and plasticizer | .5 |
| Total | 29.6 |

The spoon is coated with the primer and then used to dip a cluster of eggs directly from the bath. The spoon and eggs are then slowly cooled to room temperature to produce a secure bond between the eggs and the spoon.

Other forms of equipment and variations in the dispersion formulations, fusion bath, and method of preparing the simulated fish eggs or other artificial lures, will be apparent to those skilled in the art. Accordingly, the examples of preferred forms described are not limitive but are by way of examples only.

We claim:

1. An artificial fish lure comprising a fused resin body having a fish-attracting material dispersed uniformly throughout, said fish-attracting material continuously migrating to the surface of said body, said lure being characterized by the fish-attracting material constituting a substantial proportion of the plasticizer for the resin, and being present in the amount of at least 5 percent by weight of the lure.

2. The fish lure defined by claim 1, wherein said body is in the form of fish eggs and said material is salmon oil.

3. The fish lure defined by claim 1, wherein said body is in the form of fish eggs and said material is herring oil.

4. An artificial fish egg or fish egg cluster simulating lure or the like, comprising a fused resin body having an oily, fish-attracting plasticizing material for the resin uniformly dispersed throughout the body, said lure being characterized by the fish-attracting and plasticizing material making up at least 5 percent by weight of the lure.

5. The artificial lure defined by claim 4, wherein said fish attracting material "spews" to a "milky" emulsion at the surface of the body when exposed to water.

6. The artificial lure defined by claim 4, wherein said fish attracting material includes an odorant that migrates to the surface of the body as the odorant already at the surface is emulsified in the water during use of the lure.

7. The fish lure defined by claim 4, wherein said resinous body includes a fused thermoplastic and said odorant is thermally diffused therein, said resinous body having a Shore-A-Durometer hardness from about 3—10.

8. The fish lure defined by claim 4, further including a fluroscent dye substantially uniformly dispersed throughout the body.

9. The fish lure defined by claim 6, further including a fluroescent dye substantially uniformly dispersed throughout the body.

10. The fish lure defined by claim 4, wherein said resinous body includes a plurality of substantially spherical resinous bodies fused together in the form of a part of a fish skein.

11. The fish lure defined by claim 9, wherein said resinous body includes a plurality of substantially spherical resinous bodies fused together in the form of a part of a fish skein.

12. The fish lure defined by claim 4, wherein said resinous body comprises highly plasticized polyvinyl chloride resin having high slip and permanence characteristics.

13. The fish lure defined by claim 9, wherein said resinous body comprises highly plasticized polyvinyl chloride resin having high slip and permanence characteristics.

14. The fish lure defined by claim 4, wherein said fish-attracting material at least principally comprises salmon oil.

15. The fish lure defined by claim 4, wherein said fish-attracting material includes herring oil.

16. An artificial fish egg lure comprising a plurality of generally spherical, thermoplastic bodies of a fish-attracting color, each in fused contact with at least one other such body, and each having a relative constituency of about 15—30 weight percent resin and about 70—85 weight percent plasticizer, with a Shore-A-Durometer hardness from about 3—10, said lure being characterized by the presence of natural fish oil making up at least about 5 percent by weight of the lure and functioning as a plasticizer for the resin and also as a fish attractant.

17. The fish egg lure defined by claim 16, wherein said harness is about 5—6.

18. The fish egg lure defined by claim 16, wherein said plasticizer includes a fish-attracting odorant.

19. The fish egg lure defined by claim 18, wherein said color includes a fish-attracting fluorescent dye uniformly dispersed throughout each body.